(12) United States Patent
Wan et al.

(10) Patent No.: US 11,219,841 B2
(45) Date of Patent: Jan. 11, 2022

(54) HEAT EXCHANGE DEVICE FEATURING GAS-LIQUID SEPARATION

(71) Applicant: Man Zai Industrial Co., LTD., Tainan (TW)

(72) Inventors: Cheng-Chien Wan, Tainan (TW); Cheng-Jui Wan, Tainan (TW); Chun-Hsien Su, Tainan (TW); Hui-Fen Huang, Tainan (TW)

(73) Assignee: MAN ZAI INDUSTRIAL CO., LTD., Tainan (TW)

( * ) Notice: Subject to any disclaimer, the term of this patent is extended or adjusted under 35 U.S.C. 154(b) by 83 days.

(21) Appl. No.: 16/704,723

(22) Filed: Dec. 5, 2019

(65) Prior Publication Data

US 2021/0113938 A1    Apr. 22, 2021

(30) Foreign Application Priority Data

Oct. 17, 2019    (TW) .................... 108137523

(51) Int. Cl.
| | |
|---|---|
| *F28F 3/00* | (2006.01) |
| *B01D 5/00* | (2006.01) |
| *F28D 9/00* | (2006.01) |
| *F28D 15/02* | (2006.01) |

(52) U.S. Cl.
CPC ......... *B01D 5/0015* (2013.01); *F28D 9/0062* (2013.01); *F28D 15/0266* (2013.01)

(58) Field of Classification Search
CPC .. B01D 5/0015; F28D 9/0062; F28D 15/0266
USPC ........................................................ 165/166
See application file for complete search history.

(56) References Cited

U.S. PATENT DOCUMENTS

| | | | | |
|---|---|---|---|---|
| 4,480,684 | A * | 11/1984 | Onishi | .................... F28F 1/325 165/110 |
| 6,442,951 | B1 * | 9/2002 | Maeda | .................. F24F 3/1423 62/271 |
| 2010/0050685 | A1 * | 3/2010 | Yanik | ...................... F25B 39/00 62/515 |

(Continued)

*Primary Examiner* — Davis D Hwu
(74) *Attorney, Agent, or Firm* — Muncy, Geissler, Olds and Lowe, P.C.

(57) ABSTRACT

The present invention provides a heat exchange device featuring gas-liquid separation, comprising an evaporator unit and a condenser unit. The condenser unit comprises a central main guide tube, a plurality of condensation tubes connected to the two lateral sides of the central main guide tube, and a heat dissipation fin assembly provided on a periphery of each condensation tube. The central main guide tube comprises a gaseous-phase confluence chamber and a liquid-phase confluence chamber. The gaseous-phase confluence chamber is provided in an upper portion of the central main guide tube and communicates with the gas outlet through a gaseous-phase connection tube, and the liquid-phase confluence chamber is provided in a lower portion of the central main guide tube and communicates with the evaporation chamber through a liquid-phase connection tube. Each condensation tube comprises a first communicating section in communication with the gaseous-phase confluence chamber, a bent section bent downward from the first communicating section, and a second communicating section connecting the bent section to the liquid-phase confluence chamber.

11 Claims, 12 Drawing Sheets

(56) References Cited

U.S. PATENT DOCUMENTS

2011/0290448 A1* 12/2011 Campbell .......... H05K 7/20572
165/104.13
2016/0061532 A1* 3/2016 Espersen ............... F28D 15/025
165/104.21

* cited by examiner

HEAT EXCHANGE DEVICE FEATURING GAS-LIQUID SEPARATION

BACKGROUND OF THE INVENTION

1. Technical Field

The present invention relates to a gas-liquid heat exchanger. More particularly, the invention relates to a heat exchange device that features gas-liquid separation and is suitable for use in an electronic product, wherein the gas-liquid separation is achieved by separating the path of a working gas from that of a working liquid.

2. Description of Related Art

The information explosion has brought about the widespread presence of powerful and highly efficient electronic products in our daily lives. These electronic products are generally provided with a central processing unit (CPU) for processing commands and software data. The operation speed and data transfer rate of such an electronic product hinge on the performance of its CPU.

A CPU generates a considerable amount of heat during operation. If the heat cannot be effectively dissipated, the CPU will be overheated, and the electronic product using the CPU may eventually slow down or even stop working as a result. The high temperature of the overheated CPU may also damage the neighboring electronic components over time such that the service life of the electronic product is cut short. It is therefore imperative to install a heat dissipation device where the electronic product generates most of the heat, in order for the heat dissipation device to dissipate the heat (i.e., to cool the electronic product) rapidly through thermal conduction or convection, thereby protecting the electronic product and maintaining its normal operation.

One typical technique for cooling the CPU of an electronic product is to provide the electronic product with a built-in fan, the objective being to generate an airflow that helps bring down the temperature of the CPU; however, the cooling effect of the fan is quite limited when ambient temperature is high. Considering that the conventional CPU cooling methods still leave room for improvement, the inventor of the present invention thought it necessary to devise a novel method for cooling a CPU effectively.

BRIEF SUMMARY OF THE INVENTION

The primary objective of the present invention is to provide a heat exchange device that features gas-liquid separation and is suitable for use in an electronic product.

In order to achieve the above objective, the present invention provides a heat exchange device featuring gas-liquid separation, comprising an evaporator unit and a condenser unit. The evaporator unit comprises a housing, an evaporation chamber provided in the housing, and a gas outlet provided at a top side of the evaporation chamber. The condenser unit comprises a central main guide tube, a plurality of condensation tubes connected to the central main guide tube, and a heat dissipation fin assembly provided on a periphery of each condensation tube. The central main guide tube comprises a gaseous-phase confluence chamber and a liquid-phase confluence chamber. The gaseous-phase confluence chamber is provided in an upper portion of the central main guide tube and communicates with the gas outlet through a gaseous-phase connection tube, and the liquid-phase confluence chamber is provided in a lower portion of the central main guide tube and communicates with the evaporation chamber through a liquid-phase connection tube. The condensation tubes are connected to two lateral sides of the central main guide tube in pairs, and each condensation tube comprises a first communicating section in communication with the gaseous-phase confluence chamber, a bent section bent downward from the first communicating section, and a second communicating section connecting the bent section to the liquid-phase confluence chamber.

In order to achieve the above objective, the present invention also provides a heat exchange device featuring gas-liquid separation, comprising an evaporator unit and a condenser unit. The evaporator unit comprises a housing, an evaporation chamber provided in the housing, and a gas outlet provided at a top side of the evaporation chamber. The condenser unit comprises a first-side main guide tube, a second-side main guide tube, at least one condensation tube, and a heat dissipation fin assembly provided on a periphery of the condensation tube. The condensation tube has two ends connected respectively to the first-side main guide tube and the second-side main guide tube. The first-side main guide tube comprises a gaseous-phase confluence chamber in communication with the gas outlet through a gaseous-phase connection tube, and the second-side main guide tube comprises a liquid-phase confluence chamber in communication with the evaporation chamber through a liquid-phase connection tube.

Furthermore, the heat dissipation fin assembly is composed of a plurality of recumbent square U-shaped fins that are sequentially connected in a head-to-tail manner, or is an integrated wavy fin assembly extruded through rollers or stamping.

Furthermore, the heat dissipation fin assembly and the condensation tubes are made of aluminum and/or copper.

Furthermore, the first-side main guide tube and the second-side main guide tube respectively include a tube body, a sealing cap provided at one end of the tube body, and a connecting cap provided at the other end of the tube body.

Furthermore, the housing is provided with a heat dissipation cover, which covers a portion of the gaseous-phase connection tube and is made of aluminum or copper; and, the heat dissipation cover is composed of a plurality of recumbent square U-shaped fins that are sequentially connected in a head-to-tail manner, or is an integrated wavy fin assembly extruded through rollers or stamping.

Furthermore, the position at which the gaseous-phase connection tube is connected to the housing is higher than the position at which the liquid-phase connection tube is connected to the housing.

Furthermore, the gaseous-phase connection tube has a larger tube diameter than the liquid-phase connection tube.

Furthermore, the condensation tube is made by an aluminum extrusion means and has a flattened cross section.

Furthermore, the condensation tube is provided therein with a plurality of supporting ribs.

Furthermore, the inner wall of the condensation tube and the surface of each supporting rib are respectively provided with a plurality of microstructures.

Furthermore, the gaseous-phase confluence chamber and the liquid-phase confluence chamber are separately provided to separate the working path of the gaseous-phase working fluid from that of the liquid-phase working fluid, thereby eliminating the impedance the liquid-phase working fluid may otherwise experience when flowing back.

Furthermore, the evaporator unit and the condenser unit are separately provided and are connected by the gaseous-phase connection tube and the liquid-phase connection tube, the evaporator unit lies compliantly on an external electronic device, and the condenser unit is disposed adjacent to an external fan to receive a largest possible airflow to enhance heat dissipation efficiency.

Comparing to the conventional techniques, the present invention has the following advantages:

The present invention provides a heat exchange device that features gas-liquid separation. More specifically, the condenser unit of the heat exchange device is provided with a central main guide tube (or two lateral main guide tubes) that separates (or separate) the working path of the gaseous-phase working fluid from that of the liquid-phase working fluid, thereby solving the prior art problem that the returning liquid-phase working fluid tends to be impeded and thus result in a reduction in heat dissipation efficiency. According to the invention, not only can the working fluid be circulated continuously, but also the separately provided condenser unit and evaporator unit are connected by a gaseous-phase connection tube and a liquid-phase connection tube that allow the condenser unit to be disposed adjacent to an external fan in order to receive the largest airflow possible, thereby enhancing the heat dissipation efficiency at the evaporation end as well as the condensation end to rapidly cool the external electronic device to which the evaporator unit is applied.

DETAILED DESCRIPTION OF THE INVENTION

The details and technical solution of the present invention are hereunder described with reference to accompanying drawings. For illustrative sake, the accompanying drawings are not drawn to scale. The accompanying drawings and the scale thereof are not restrictive of the present invention.

Figure 1:
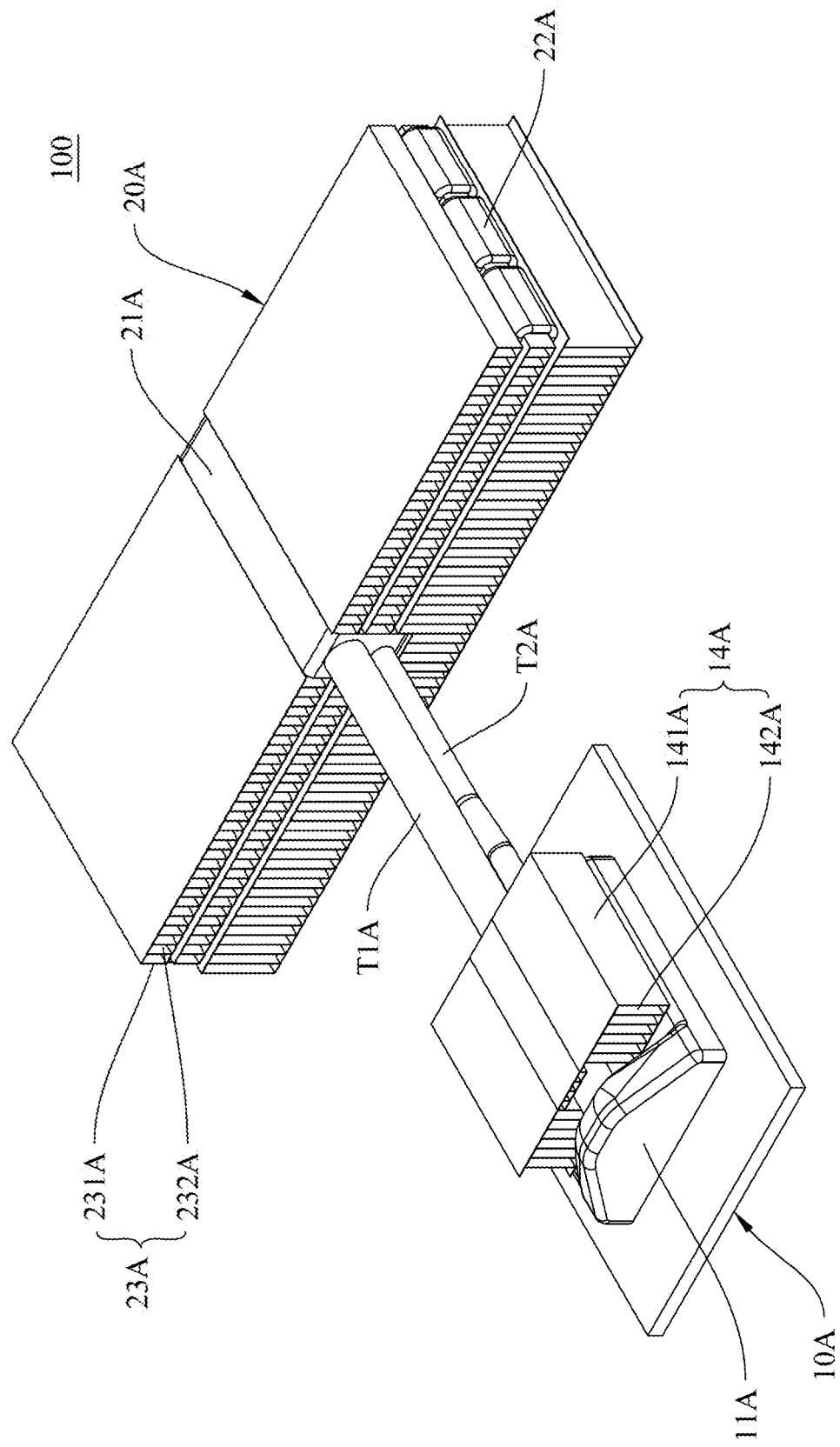
FIG. 1 is a first perspective view of the heat exchange device featuring gas-liquid separation according to the first embodiment of the present invention.
Figure 2:
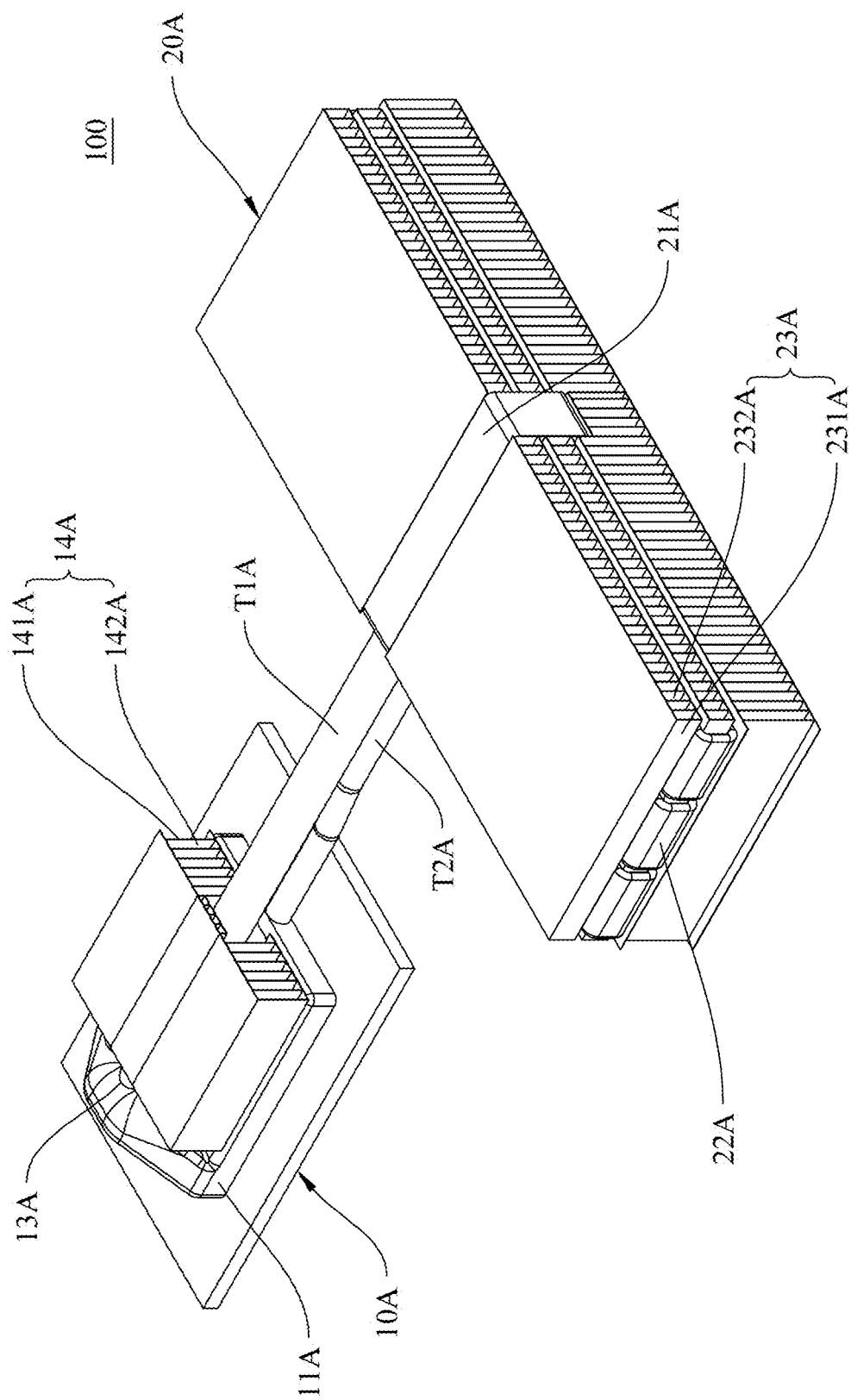
FIG. 2 is a second perspective view of the heat exchange device featuring gas-liquid separation according to the first embodiment of the present invention.

Please refer to FIG. 1 and FIG. 2 for two perspective views of the heat exchange device featuring gas-liquid separation according to the first embodiment of the present invention.

The present invention discloses a heat exchange device 100 featuring gas-liquid separation (hereinafter referred to as the gas-liquid separated heat exchange device 100) as shown in FIG. 1 and FIG. 2. The gas-liquid separated heat exchange device 100 is configured for use mainly in the fields of optics, communications, data processing, servers, and so on where high-heat laminated circuits are generally required. The invention can be applied to such electronic products as servers, data displays, remote radio units (RRUs) for communication purposes, artificial intelligence (AI) devices, display chips, and laser chips to produce a cooling/heat dissipation effect through conduction-, convection-, or material-based heat exchange. The gas-liquid separated heat exchange device 100 is advantageously compact and efficient in heat dissipation and is therefore suitable for use in an electronic product with a limited internal mounting space.

The gas-liquid separated heat exchange device 100 includes an evaporator unit 10A and a condenser unit 20A. A gaseous-phase connection tube T1A and a liquid-phase connection tube T2A are provided between the evaporator unit 10A and the condenser unit 20A to connect the two units together. A working fluid is circulated through the two units while undergoing a cyclic change of phase, which occurs when the working fluid is changed between a heat-absorbing state and a heat-releasing state. The phase change helps cool down the electronic product to which the gas-liquid separated heat exchange device 100 is applied, lest the electronic components of the product be damaged, or the performance of the product be lowered, by prolonged exposure to high heat.

Figure 3:
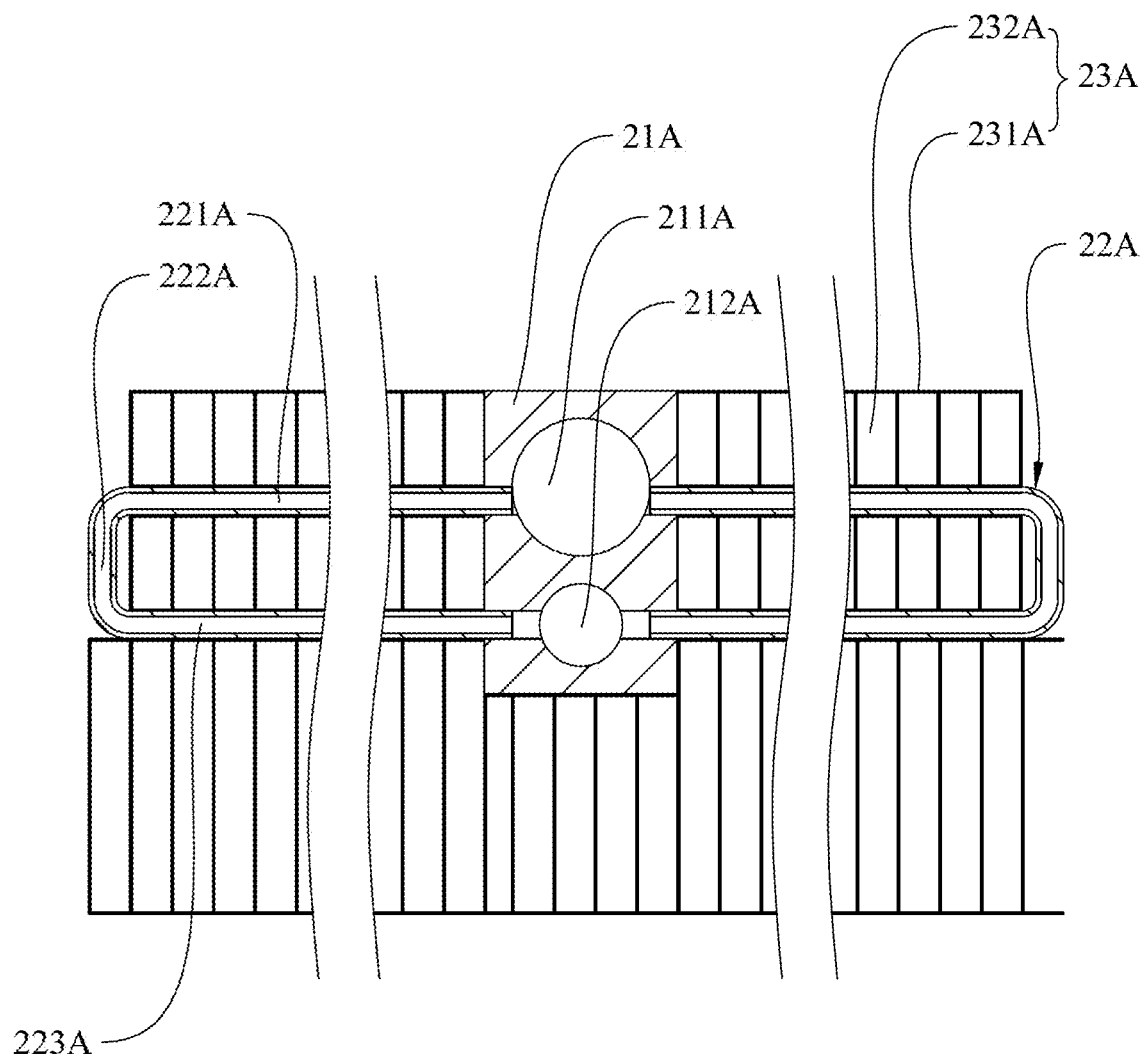
FIG. 3 is a first sectional view of the heat exchange device featuring gas-liquid separation according to the first embodiment of the present invention.
Figure 4:
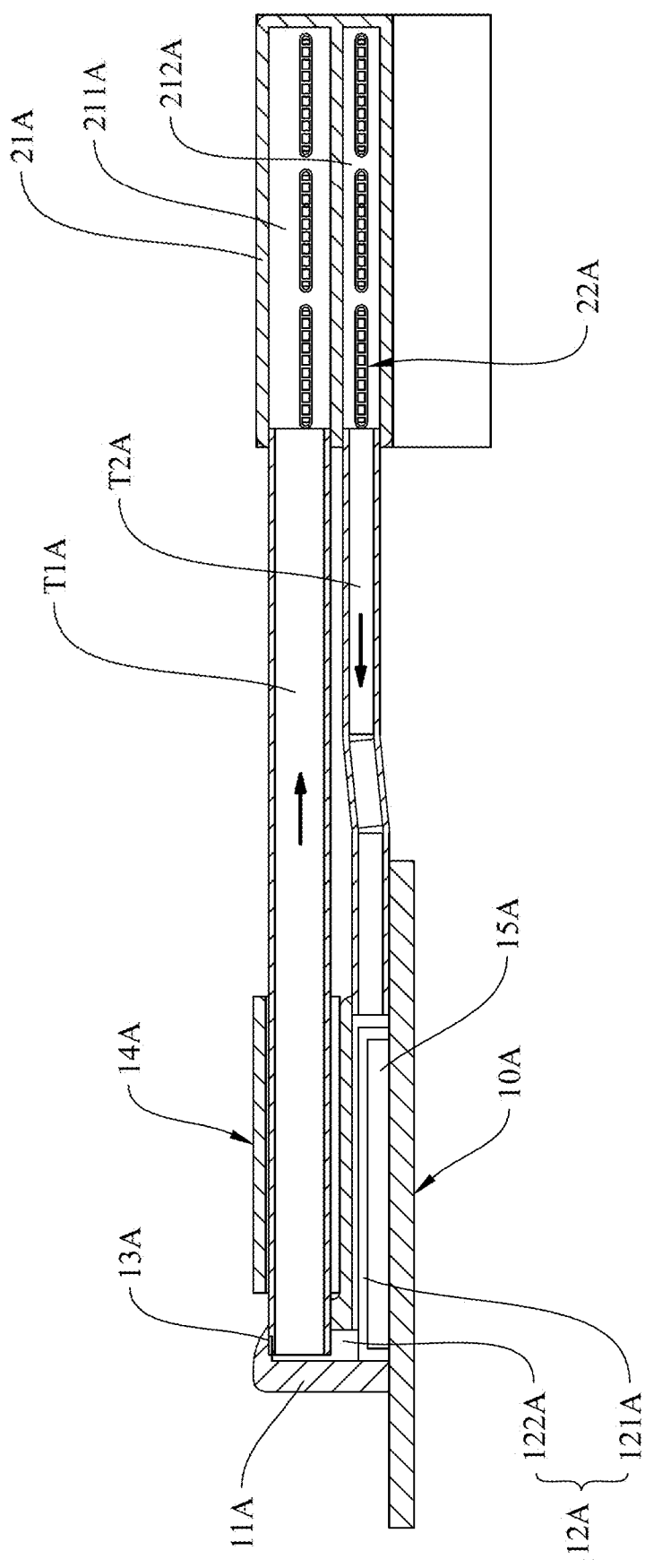
FIG. 4 is a second sectional view of the heat exchange device featuring gas-liquid separation according to the first embodiment of the present invention.

Please refer to FIG. 3 and FIG. 4 for two sectional views of the gas-liquid separated heat exchange device shown in FIG. 1 and FIG. 2.

In this embodiment, the evaporator unit 10A includes a housing 11A, an evaporation chamber 12A provided in the housing 11A, and a gas outlet 13A provided at the top side of the evaporation chamber 12A. The housing 11A is provided with a heat dissipation cover 14A, which covers a portion of the gaseous-phase connection tube T1A. The heat dissipation cover 14A is made of aluminum or copper and is composed of a plurality of recumbent square U-shaped fins 141A that are sequentially connected in a head-to-tail manner. The gaps between the recumbent square U-shaped fins 141A form a plurality of airflow channels 142A that allow passage of air. The width of each airflow channel 142A may range from 0.8 mm to 2 mm to increase the area of contact between the evaporator unit 10A and air and thereby enhance heat dissipation.

The evaporation chamber 12A is provided therein with a plurality of fins 15A. The fins 15A are integrally formed on the housing 11A by a relieving means and each have a thickness ranging from 0.2 mm to 1 mm to facilitate heat exchange between the fins 15A and the liquid-phase working fluid. The gaps between the fins 15A form a plurality of liquid channels to allow passage of the liquid-phase working fluid. The gaps between the fins 15A may range from 0.2 mm to 1 mm to enable sufficient contact, and hence heat exchange, between the liquid-phase working fluid and the fins 15A. The evaporation chamber 12A includes a first vapor chamber 121A, which accommodates the fins 15A, and a second vapor chamber 122A, which lies above and communicates with the first vapor chamber 121A. The space in the second vapor chamber 122A is smaller than that in the first vapor chamber 121A to effect an increase in speed of the working fluid.

The condenser unit 20A includes a central main guide tube 21A, at least one condensation tube 22A connected to the central main guide tube 21A (a plurality of condensation tubes 22A being provided in this embodiment by way of example), and a heat dissipation fin assembly 23A provided on the peripheries of the condensation tubes 22A. The heat dissipation fin assembly 23A and the condensation tubes 22A are made of aluminum or copper and are soldered together to avoid gaps in the connected surfaces between the heat dissipation fin assembly 23A and the condensation tubes 22A, the goal being to achieve better thermal conduction through tighter connection between the heat dissipation fin assembly 23A and the condensation tubes 22A. To dissipate heat more efficiently, the heat dissipation fin assembly 23A and the condensation tubes 22A are preferably made of aluminum. The heat dissipation fin assembly 23A is composed of a plurality of recumbent square U-shaped fins 231A that are sequentially connected in a head-to-tail manner. The gaps between the recumbent square U-shaped fins 231A form a plurality of airflow channels 232A that allow passage of air. The width of each airflow channel 232A may range from 0.8 mm to 2 mm to increase the area of contact between the condenser unit 20A and air and thereby enhance heat dissipation. In this preferred embodiment, the portion of the heat dissipation fin assembly 23A that lies beneath the condensation tubes 22A is higher than the portion of the heat dissipation fin assembly 23A that lies on top of the condensation tubes 22A, and the bottom side of the condenser unit 20A has a larger contact area than the bottom side of the evaporator unit 10A, in order to achieve highly efficient heat dissipation.

The central main guide tube 21A includes a gaseous-phase confluence chamber 211A and a liquid-phase confluence chamber 212A. The gaseous-phase confluence chamber 211A is provided in an upper portion of the central main guide tube 21A and communicates with the gas outlet 13A through the gaseous-phase connection tube T1A. The liquid-phase confluence chamber 212A is provided in a lower portion of the central main guide tube 21A and communicates with the evaporation chamber 12A through the liquid-phase connection tube T2A. The gaseous-phase confluence chamber 211A and the liquid-phase confluence chamber 212A are separately provided to separate the working path of the gaseous-phase working fluid from that of the liquid-phase working fluid, thereby eliminating the impedance the liquid-phase working fluid may otherwise experience when flowing back, lest such impedance reduce heat dissipation efficiency. The evaporator unit 10A and the condenser unit 20A are also separately provided and are connected by the gaseous-phase connection tube T1A and the liquid-phase connection tube T2A. The evaporator unit 10A is designed to lie compliantly on an electronic device. The condenser unit 20A can be disposed adjacent to a fan in order to receive the largest airflow possible to enhance the heat dissipation efficiency at the evaporation end as well as the condensation end. The position at which the gaseous-phase connection tube T1A is connected to the housing 11A is higher than the position at which the liquid-phase connection tube T2A is connected to the housing 11A. This arrangement not only allows the evaporator unit 10A to receive the liquid-phase working fluid with ease, but also uses the gravity of the liquid-phase working fluid to produce a siphoning force that causes circulation of the working fluid, thereby enabling the gas-liquid separated heat exchange device 100 to operate continuously without being driven by an electromechanical means. Moreover, the gaseous-phase connection tube T1A has a larger tube diameter than the liquid-phase connection tube T2A to make it easier for the force of gravity acting on the liquid-phase working fluid to drive the gas-liquid separated heat exchange device 100 into continuous operation.

The condensation tubes 22A are connected to the two lateral sides of the central main guide tube 21A in pairs and each include a first communicating section 221A in communication with the gaseous-phase confluence chamber 211A, a bent section 222A bent downward from the first communicating section 221A, and a second communicating section 223A connecting the bent section 222A to the liquid-phase confluence chamber 212A. The condensation tubes 22A with the bent sections 222A bring the gaseous-phase confluence chamber 211A and the liquid-phase confluence chamber 212A into communication with each other.

Figure 5:
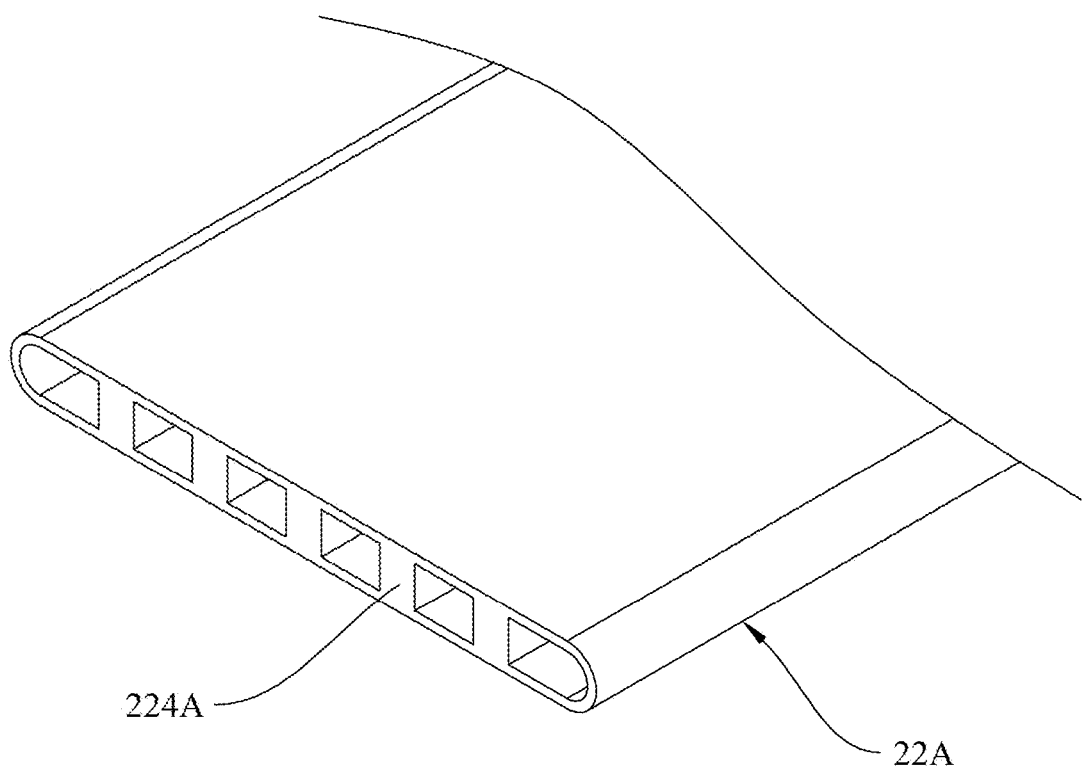
FIG. 5 shows the condensation tube of the present invention in partial perspective view.
Figure 6:
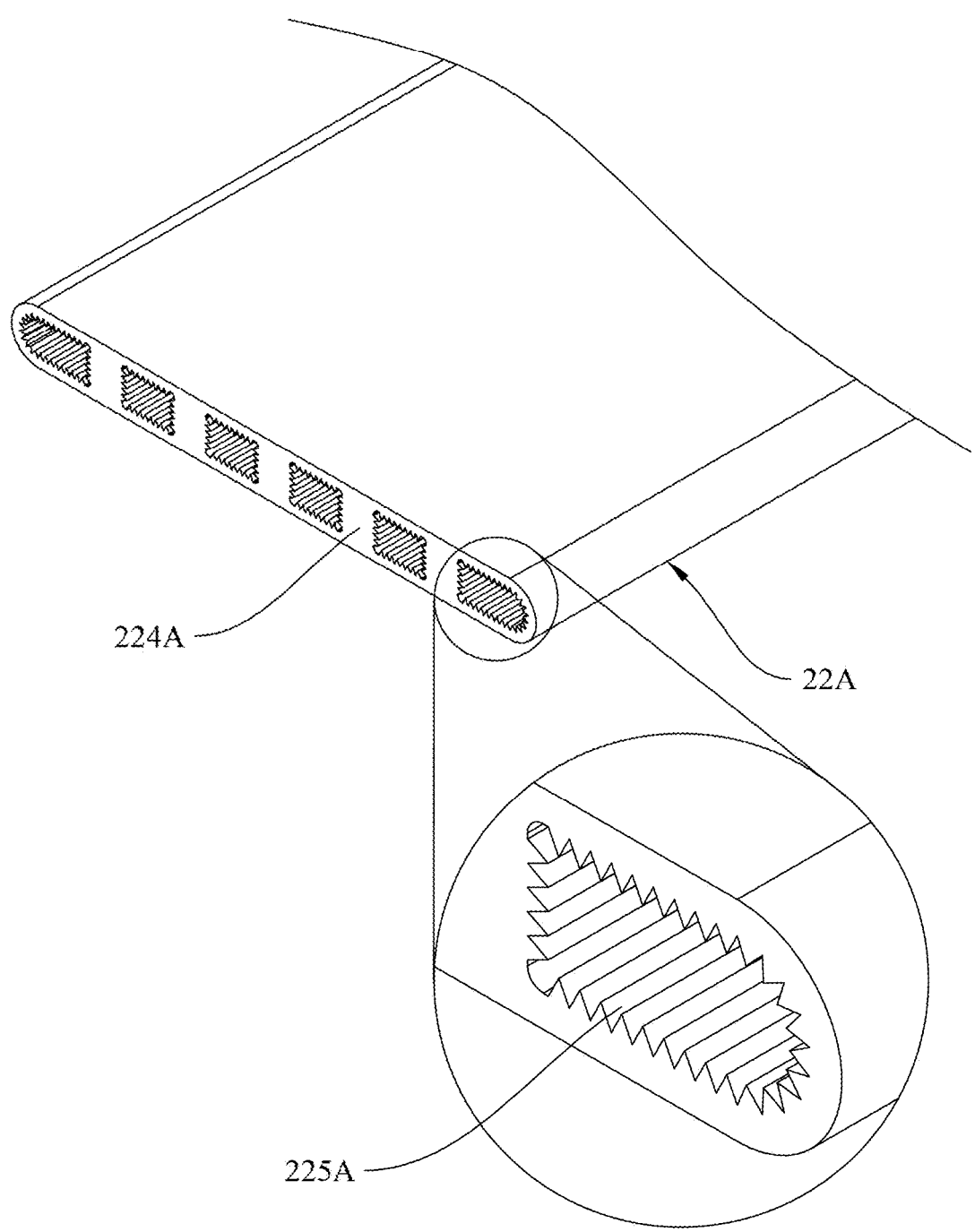
FIG. 6 is a first partial enlarged view of the condensation tube of the present invention.
Figure 7:
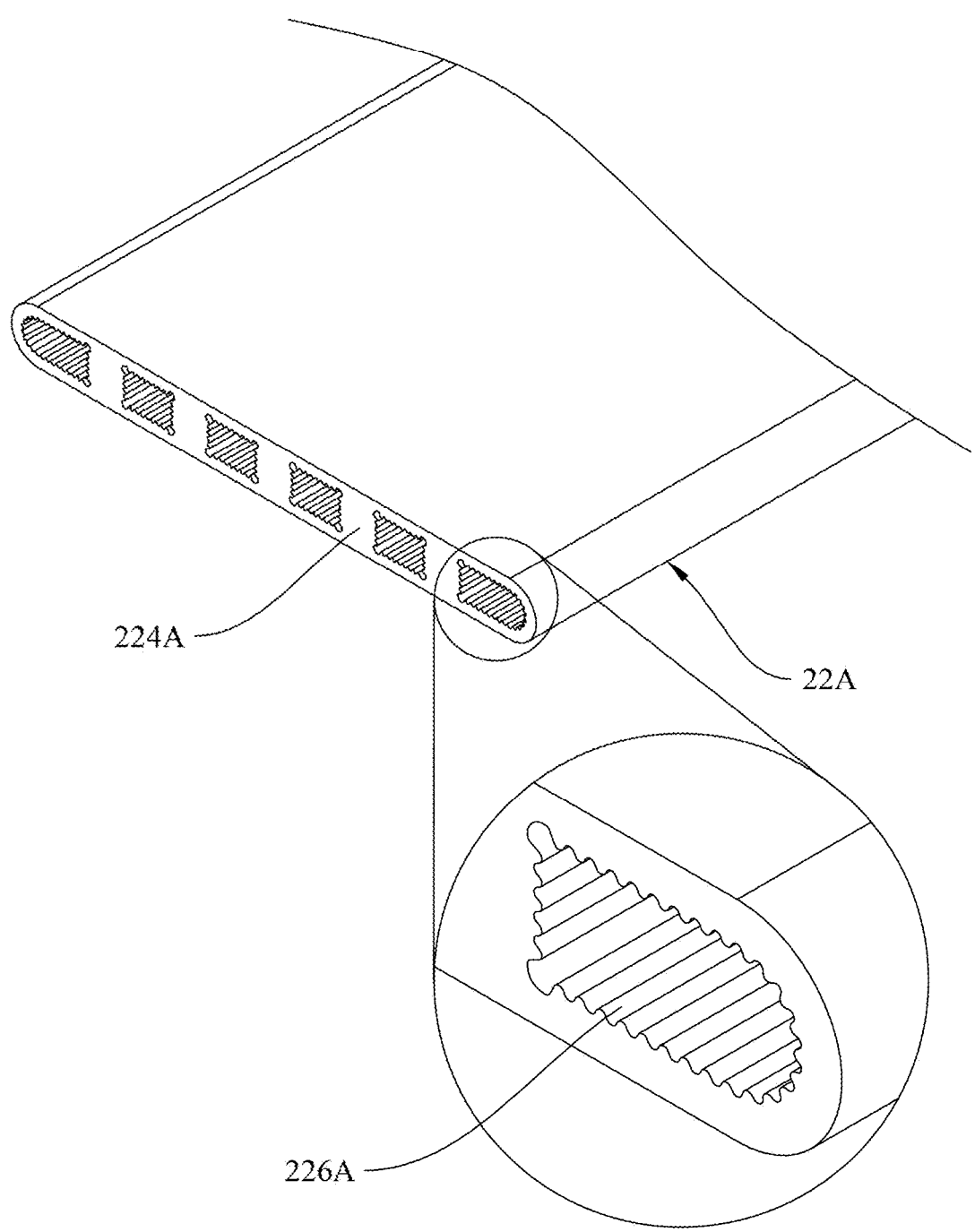
FIG. 7 is a second partial enlarged view of the condensation tube of the present invention.
Figure 8:
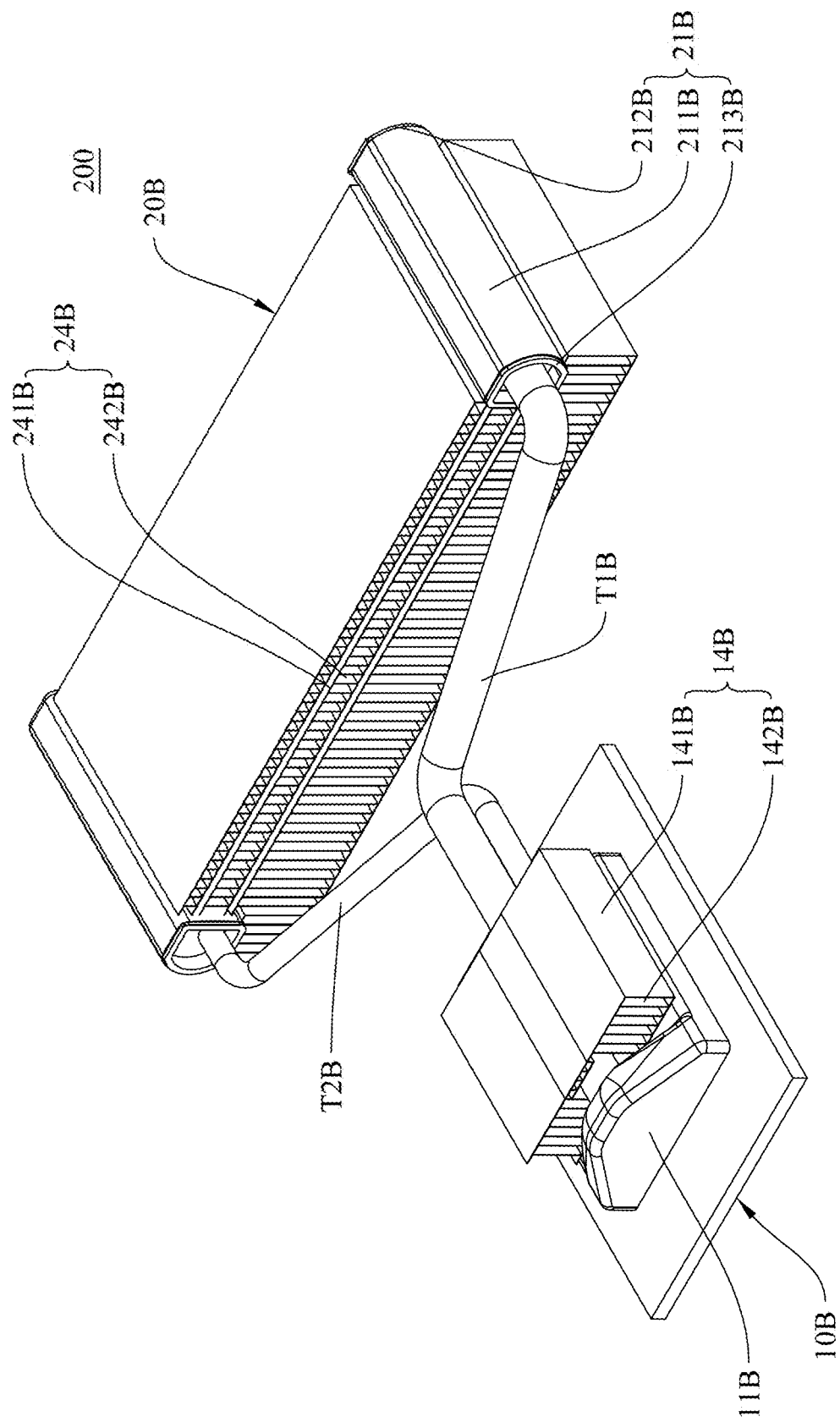
FIG. 8 is a first perspective view of the heat exchange device featuring gas-liquid separation according to the second embodiment of the present invention.
Figure 9:
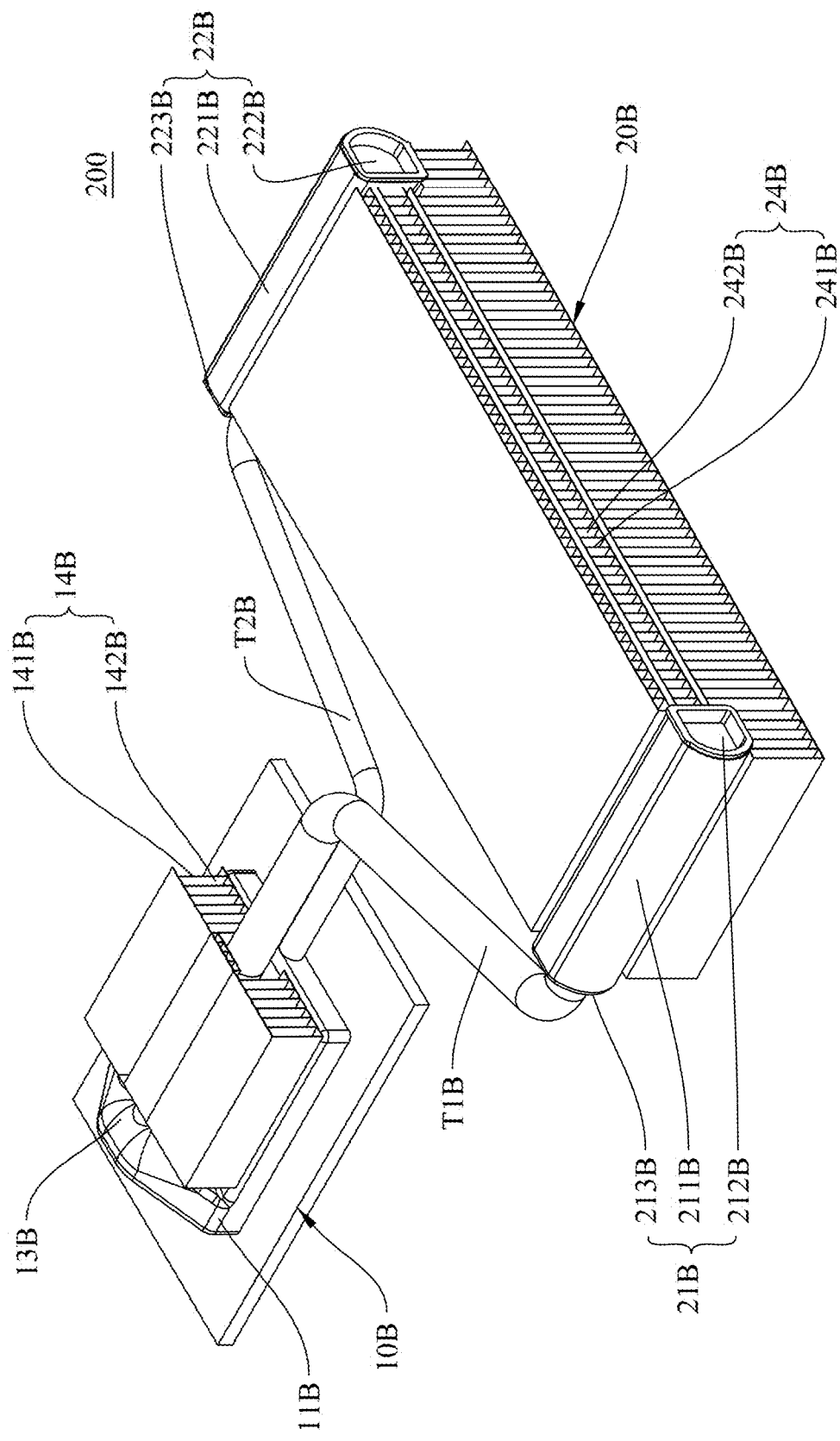
FIG. 9 is a second perspective view of the heat exchange device featuring gas-liquid separation according to the second embodiment of the present invention.
Figure 10:
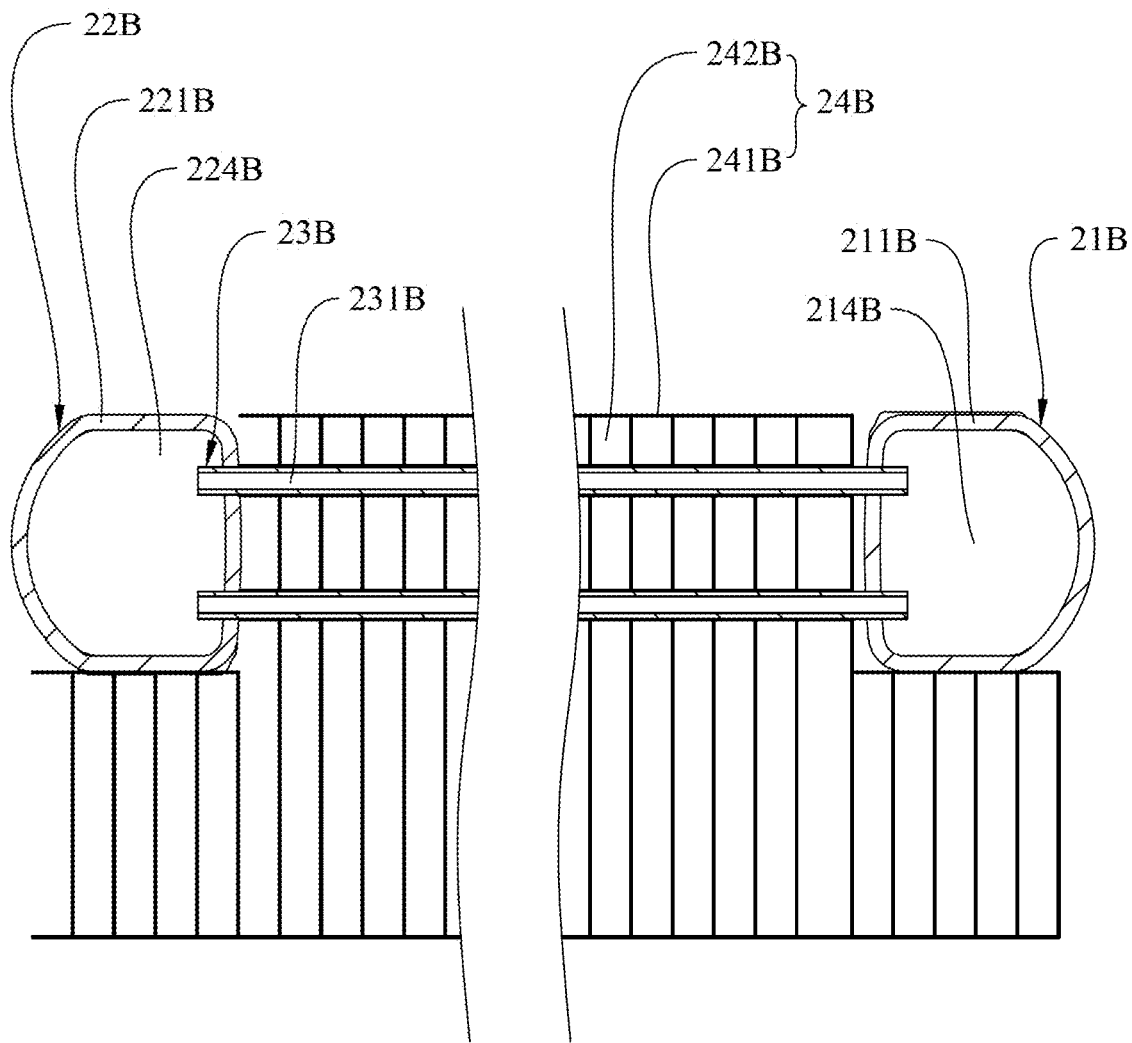
FIG. 10 is a first sectional view of the heat exchange device featuring gas-liquid separation according to the second embodiment of the present invention.
Figure 11:
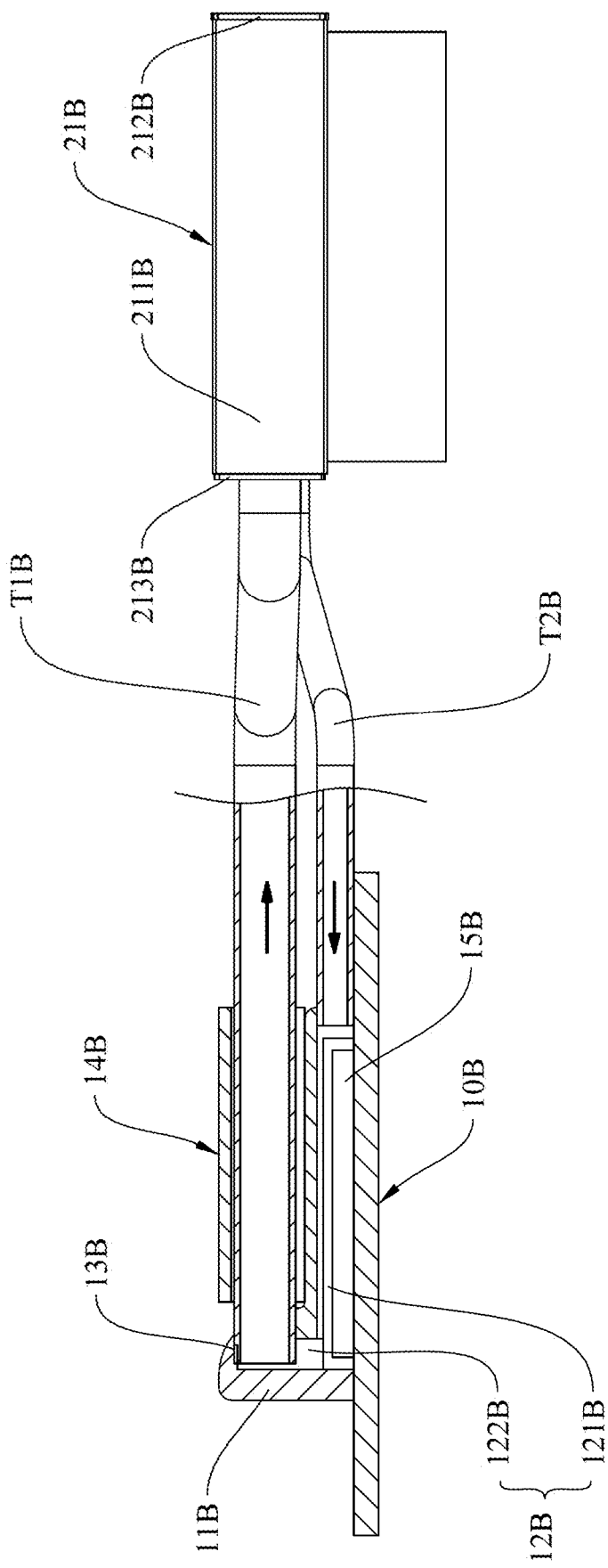
FIG. 11 is a second sectional view of the heat exchange device featuring gas-liquid separation according to the second embodiment of the present invention.

FIG. 5 to FIG. 7 show three embodiments of the condensation tube of the present invention in partial perspective view, with FIG. 6 and FIG. 7 providing additional partial enlarged views for two of the embodiments.

Referring to FIG. 5, the condensation tube 22A is made by an aluminum extrusion means so that the integrally formed condensation tube 22A can withstand the high pressure generated by the working fluid passing through the condensation tube. The condensation tube 22A has a flattened cross section, preferably of a height ranging from 1 mm to 2 mm to facilitate passage of the working fluid and enable sufficient heat absorption by the working fluid, and preferably of a width ranging from 12 mm to 40 mm to provide a relatively large heat dissipation area and thereby enhance contact, and hence heat exchange, with air and the heat dissipation fin assembly 23A. The condensation tube 22A is provided therein with a plurality of supporting ribs 224A. The supporting ribs 224A extend along the entire length of the condensation tube 22A. The number of the supporting ribs 224A may range from the value of one third of the width (in millimeter) of the condensation tube 22A to the value of the full width (in millimeter) of the condensation tube 22A. For example, when the width of the condensation tube 22A is 12 mm, there may be 4 to 12 supporting ribs 224A for reinforcing, and thereby preventing deformation of, the condensation tube 22A. The inner wall of the condensation tube 22A and the surface of each supporting rib 224A may be flat (as shown in FIG. 5) or provided with a plurality of microstructures, wherein the microstructures may be serrated structures 225A (as shown in FIG. 6), wavy structures 226A (as shown in FIG. 7), or web-like, fiber-like, grooved, or sintered capillary structures, in order to increase the area of contact between the interior of the condensation tube 22A and the working fluid and thereby enhance the efficiency of heat dissipation.

Please refer to FIG. 8 to FIG. 11 for two perspective views and two sectional views of the gas-liquid separated heat exchange device according to the second embodiment of the present invention.

In this embodiment, the gas-liquid separated heat exchange device 200 includes an evaporator unit 10B and a condenser unit 20B. A gaseous-phase connection tube T1B and a liquid-phase connection tube T2B are provided between the evaporator unit 10B and the condenser unit 20B to connect the two units together.

The evaporator unit 10B includes a housing 11B, an evaporation chamber 12B provided in the housing 11B, and a gas outlet 13B provided at the top side of the evaporation chamber 12B. The housing 11B is provided with a heat dissipation cover 14B, which covers a portion of the gaseous-phase connection tube T1B. The heat dissipation cover 14B is made of aluminum or copper and is composed of a plurality of recumbent square U-shaped fins 141B that are sequentially connected in a head-to-tail manner. The gaps between the recumbent square U-shaped fins 141B form a plurality of airflow channels 142B that allow passage of air. The width of each airflow channel 142B may range from 0.8 mm to 2 mm to increase the area of contact between the evaporator unit 10B and air and thereby enhance heat dissipation.

The evaporation chamber 12B is provided therein with a plurality of fins 15B. The fins 15B are integrally formed on the housing 11B by a relieving means and each have a thickness ranging from 0.2 mm to 1 mm to facilitate heat exchange between the fins 15B and the liquid-phase working fluid. The gaps between the fins 15B form a plurality of liquid channels to allow passage of the liquid-phase working fluid. The gaps between the fins 15B may range from 0.2 mm to 1 mm to enable sufficient contact, and hence heat exchange, between the liquid-phase working fluid and the fins 15B. The evaporation chamber 12B includes a first vapor chamber 121B, which accommodates the fins 15B, and a second vapor chamber 122B, which lies above and communicates with the first vapor chamber 121B. The space in the second vapor chamber 122B is smaller than that in the first vapor chamber 121B to effect an increase in speed of the working fluid.

The condenser unit 20B includes a first-side main guide tube 21B, a second-side main guide tube 22B, at least one condensation tube 23B (a plurality of condensation tubes 23B being provided in this embodiment by way example), and a heat dissipation fin assembly 24B provided on the peripheries of the condensation tubes 23B, wherein each condensation tube 23B has two ends connected respectively to the first-side main guide tube 21B and the second-side main guide tube 22B. The heat dissipation fin assembly 24B and the condensation tubes 23B are made of aluminum or copper and are soldered together to avoid gaps in the connected surfaces between the heat dissipation fin assembly 24B and the condensation tubes 23B, the goal being to achieve better thermal conduction through tighter connection between the heat dissipation fin assembly 24B and the condensation tubes 23B. To dissipate heat more efficiently, the heat dissipation fin assembly 24B and the condensation tubes 23B are preferably made of aluminum. The heat dissipation fin assembly 24B is composed of a plurality of recumbent square U-shaped fins 241B that are sequentially connected in a head-to-tail manner. The gaps between the recumbent square U-shaped fins 241B form a plurality of airflow channels 242B that allow passage of air. The width of each airflow channel 242B may range from 0.8 mm to 2 mm to increase the area of contact between the condenser unit 20B and air and thereby enhance heat dissipation. In this preferred embodiment, the portion of the heat dissipation fin assembly 24B that lies beneath the condensation tubes 23B is higher than the portion of the heat dissipation fin assembly 24B that lies on top of the condensation tubes 23B, and the bottom side of the condenser unit 20B has a larger contact area than the bottom side of the evaporator unit 10B, in order to achieve highly efficient heat dissipation.

The first-side main guide tube 21B includes a tube body 211B, a sealing cap 212B provided at one end of the tube body 211B, and a connecting cap 213B provided at the other end of the tube body 211B. The tube body 211B includes a gaseous-phase confluence chamber 214B, which communicates with the gaseous-phase connection tube T1B through the connecting cap 213B. The second-side main guide tube 22B includes a tube body 221B, a sealing cap 222B provided at one end of the tube body 221B, and a connecting cap 223B provided at the other end of the tube body 221B. The tube body 221B includes a liquid-phase confluence chamber 224B, which communicates with the liquid-phase connection tube T2B through the connecting cap 223B. The first-side main guide tube 21B and the second-side main guide tube 22B are connected by the condensation tubes 23B such that the gaseous-phase confluence chamber 214B and the liquid-phase confluence chamber 224B are in communication with each other. The gaseous-phase confluence chamber 214B and the liquid-phase confluence chamber 224B are separately provided to separate the working path of the gaseous-phase working fluid from that of the liquid-phase working fluid, thereby eliminating the impedance the liquid-phase working fluid may otherwise experience when flowing back, lest such impedance reduce heat dissipation efficiency. The evaporator unit 10B and the condenser unit 20B are also separately provided and are connected by the gaseous-phase connection tube T1B and the liquid-phase connection tube T2B. The evaporator unit 10B is designed to lie compliantly on an electronic device. The condenser unit 20B can be disposed adjacent to a fan in order to receive the largest airflow possible to enhance the heat dissipation efficiency at the evaporation end as well as the condensation end. The position at which the gaseous-phase connection tube T1B is connected to the housing 11B is higher than the position at which the liquid-phase connection tube T2B is connected to the housing 11B. This arrangement not only allows the evaporator unit 10B to receive the liquid-phase working fluid with ease, but also uses the gravity of the liquid-phase working fluid to produce a siphoning force that causes circulation of the working fluid, thereby enabling the gas-liquid separated heat exchange device 200 to operate continuously without being driven by an electromechanical means. Moreover, the gaseous-phase connection tube T1B has a larger tube diameter than the liquid-phase connection tube T2B to make it easier for the force of gravity acting on the liquid-phase working fluid to drive the gas-liquid separated heat exchange device 200 into continuous operation.

The condensation tubes 23B are made by an aluminum extrusion means so that the integrally formed condensation tubes 23B can withstand the high pressure generated by the working fluid passing through the condensation tubes. Each condensation tube 23B has a flattened cross section, preferably of a height ranging from 1 mm to 2 mm to facilitate passage of the working fluid and enable sufficient heat absorption by the working fluid, and preferably of a width ranging from 12 mm to 40 mm to provide a relatively large heat dissipation area and thereby enhance contact, and hence heat exchange, with air and the heat dissipation fin assembly 24B. Each condensation tube 23B is provided therein with a plurality of supporting ribs 231B that extend along the entire length of the condensation tube. The number of the supporting ribs 231B in each condensation tube 23B may range from the value of one third of the width (in millimeter) of the condensation tube 23B to the value of the full width (in millimeter) of the condensation tube 23B. For example, when the width of the condensation tube 23B is 12 mm, there may be 4 to 12 supporting ribs 231B in each condensation tube 23B to reinforce, and thereby prevent deformation of, the condensation tube 23B. The inner walls of the condensation tubes 23B and the surface of each supporting rib 231B may be flat or provided with a plurality of microstructures, wherein the microstructures may be serrated structures, wavy structures, or web-like, fiber-like, grooved, or sintered capillary structures, in order to increase the area of contact between the interiors of the condensation tubes 23B and the working fluid and thereby enhance the efficiency of heat dissipation. The condensation tubes 23B in this embodiment are different from the condensation tubes 22A in the previous embodiment only in that the former lack the bent sections 222A. For the sake of brevity, therefore, the condensation tubes 23B will not be further described with reference to the drawings.

Figure 12:
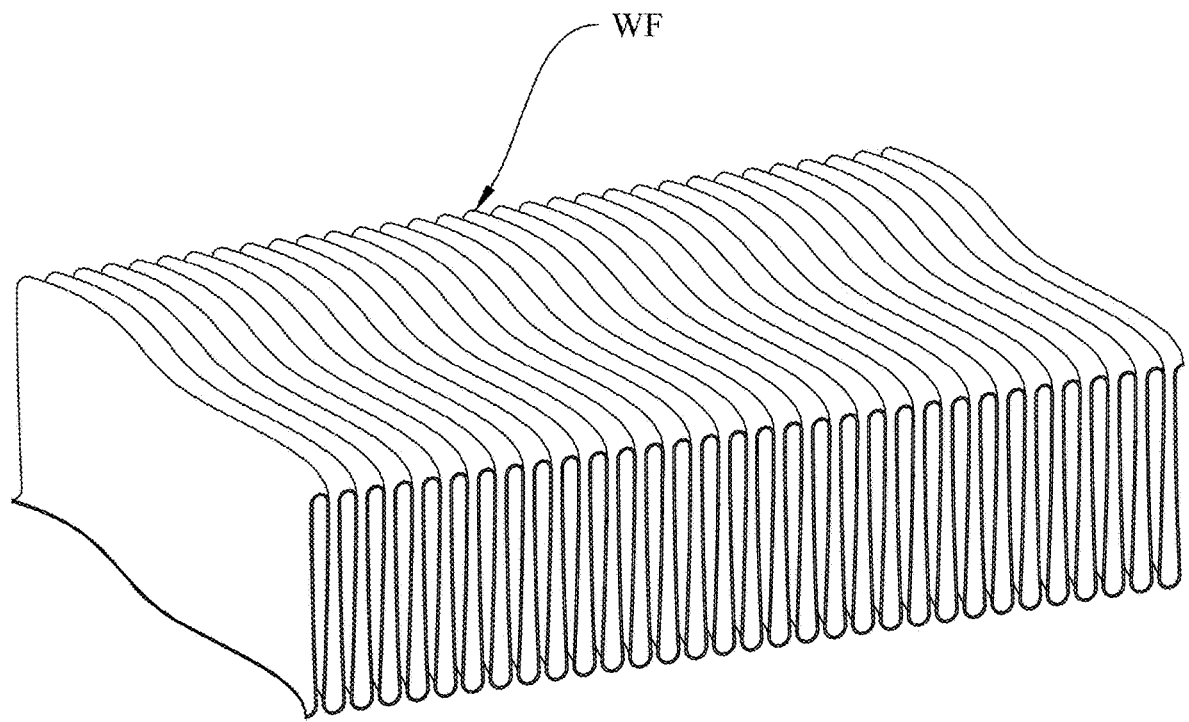
FIG. 12 is a perspective view of the heat dissipation cover and the heat dissipation fin assembly according to another embodiment of the present invention.

In the two embodiments of the present invention, the specific structures of the heat dissipation cover and the heat dissipation fin assembly not only can be composed of a plurality of recumbent square U-shaped fins that are sequentially connected in a head-to-tail manner, but also can be an integrated wavy fin assembly extruded through rollers or stamping, as shown in FIG. 12. The integrated wavy fin assembly also provides a densely arranged heat dissipating surface and air flow passages to enhance the overall heat dissipation efficiency of the gas-liquid separated heat exchange device.

According to the above, the central main guide tube (or the two lateral main guide tubes) in the condenser unit of the present invention separates (or separate) the working path of the gaseous-phase working fluid from that of the liquid-phase working fluid to prevent a reduction in heat dissipation efficiency as may otherwise result from the returning liquid-phase working fluid being impeded. Moreover, the provision of the gaseous-phase connection tube and the liquid-phase connection tube makes it possible to dispose the condenser unit adjacent to a fan so that the condenser unit can receive the largest possible airflow to enhance the heat dissipation efficiency at both the condensation end and the evaporation end.

The above is the detailed description of the present invention. However, the above is merely the preferred embodiment of the present invention and cannot be the limitation to the implement scope of the present invention, which means the variation and modification according to the present invention may still fall into the scope of the invention.

What is claimed is:

1. A heat exchange device featuring gas-liquid separation, comprising:
    an evaporator unit comprising a housing, an evaporation chamber provided in the housing, and a gas outlet provided at a top side of the evaporation chamber; and
    a condenser unit comprising a central main guide tube, a plurality of condensation tubes connected to the central main guide tube, and a heat dissipation fin assembly provided on a periphery of each condensation tube, wherein the central main guide tube comprises a gaseous-phase confluence chamber and a liquid-phase confluence chamber, the gaseous-phase confluence chamber is provided in an upper portion of the central main guide tube and communicates with the gas outlet through a gaseous-phase connection tube, the liquid-phase confluence chamber is provided in a lower portion of the central main guide tube and communicates with the evaporation chamber through a liquid-phase connection tube, the condensation tubes are connected to two lateral sides of the central main guide tube in pairs, and each condensation tube comprises a first communicating section in communication with the gaseous-phase confluence chamber, a bent section bent downward from the first communicating section, and a second communicating section connecting the bent section to the liquid-phase confluence chamber.

2. The heat exchange device featuring gas-liquid separation of claim 1, wherein the heat dissipation fin assembly is composed of a plurality of recumbent square U-shaped fins that are sequentially connected in a head-to-tail manner, or is an integrated wavy fin assembly extruded through rollers or stamping.

3. The heat exchange device featuring gas-liquid separation of claim 1, wherein the heat dissipation fin assembly and the condensation tubes are made of aluminum and/or copper.

4. The heat exchange device featuring gas-liquid separation of claim 1, wherein the housing is provided with a heat dissipation cover, which covers a portion of the gaseous-phase connection tube and is made of aluminum or copper; and, the heat dissipation cover is composed of a plurality of recumbent square U-shaped fins that are sequentially connected in a head-to-tail manner, or is an integrated wavy fin assembly extruded through rollers or stamping.

5. The heat exchange device featuring gas-liquid separation of claim 1, wherein a position at which the gaseous-phase connection tube is connected to the housing is higher than a position at which the liquid-phase connection tube is connected to the housing.

6. The heat exchange device featuring gas-liquid separation of claim 1, wherein the gaseous-phase connection tube has a larger tube diameter than the liquid-phase connection tube.

7. The heat exchange device featuring gas-liquid separation of claim 1, wherein the condensation tube is made by an aluminum extrusion means and has a flattened cross section.

8. The heat exchange device featuring gas-liquid separation of claim 1, wherein the condensation tube is provided therein with a plurality of supporting ribs.

9. The heat exchange device featuring gas-liquid separation of claim 4, wherein a inner wall of the condensation tube and a surface of each supporting rib are respectively provided with a plurality of microstructures.

10. The heat exchange device featuring gas-liquid separation of claim 1, wherein the gaseous-phase confluence chamber and the liquid-phase confluence chamber are separately provided to separate a working path of a gaseous-phase working fluid from that of a liquid-phase working fluid, thereby eliminating an impedance the liquid-phase working fluid experiences when flowing back.

11. The heat exchange device featuring gas-liquid separation of claim 1, wherein the evaporator unit and the condenser unit are separately provided and are connected by the gaseous-phase connection tube and the liquid-phase connection tube, the evaporator unit lies compliantly on an external electronic device, and the condenser unit is disposed adjacent to an external fan to receive a largest possible airflow to enhance heat dissipation efficiency.

* * * * *